Aug. 2, 1955    C. A. MENDENHALL    2,714,312
STARTER GEARING FOR INTERNAL COMBUSTION ENGINES
Filed Nov. 12, 1953
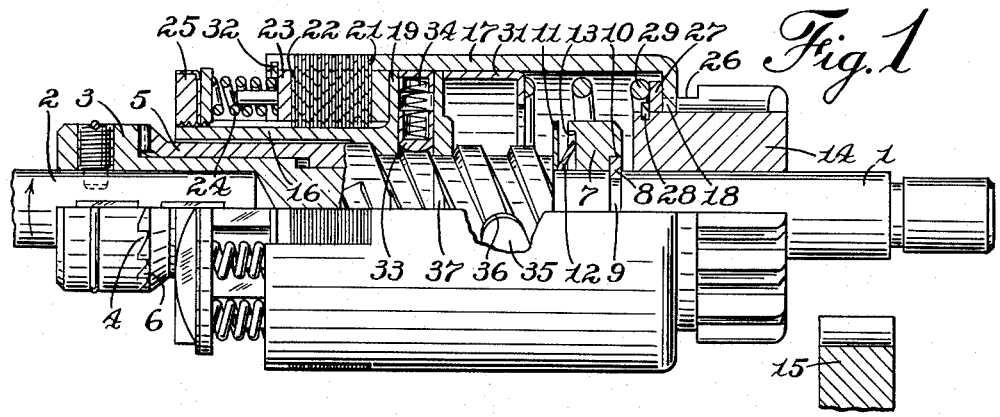
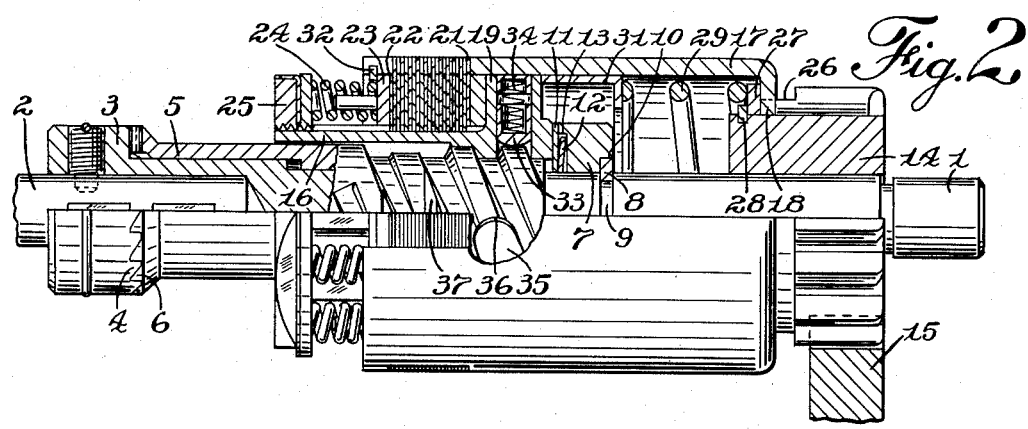
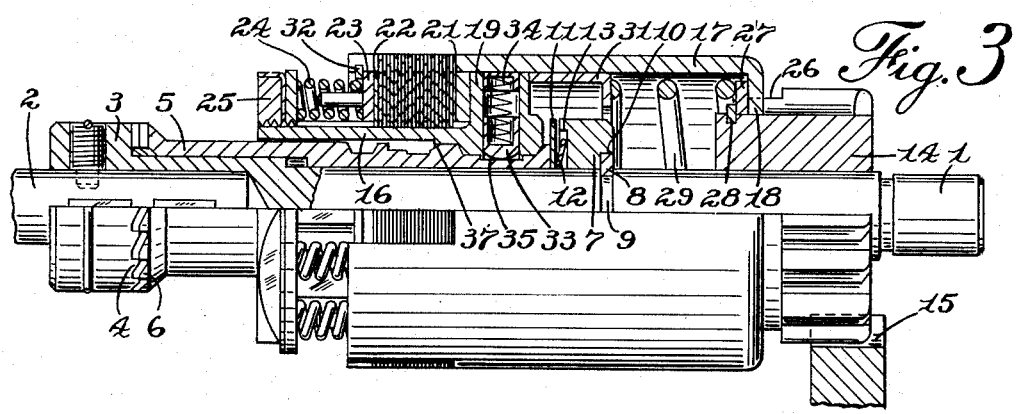
WITNESS:
Esther M. Stockton
INVENTOR.
Charles A. Mendenhall
BY
Clinton S. James
ATTORNEY

United States Patent Office 2,714,312
Patented Aug. 2, 1955

2,714,312

STARTER GEARING FOR INTERNAL COMBUSTION ENGINES

Charles A. Mendenhall, Horseheads, N. Y., assignor to Bendix Aviation Corporation, a corporation of Delaware Application November 12, 1953, Serial No. 391,403

4 Claims. (Cl. 74—7)

The present invention relates to starter gearing for internal combustion engines, and more particularly to a heavy duty starter driver of the automatically traversing type.

It is an object of the present invention to provide a novel drive of this type which maintains its meshing engagement with the engine to be started until the engine is reliably self-operative.

It is another object to provide such a device in which the parts to be traversed have a relatively high polar moment of inertia which assures satisfactory meshing characteristics even under adverse conditions.

It is another object to provide such a device including means for enforcing mesh of the gearing in case of tooth abutment, which operates effectively with a minimum of impact or shock loads.

It is another object to provide such a device having a clutch connection to the power shaft which drives positively and overruns freely and quietly when the engine starts.

It is another object to provide such a device in which the control of the overrunning clutch is entirely free from, and independent of, the mesh enforcing means.

Further objects and advantages will be apparent from the following description taken in connection with the accompanying drawing in which:

Fig. 1 is a side elevation partly broken away and in section, of a preferred embodiment of the invention showing the parts in normal or idle position;

Fig. 2 is a view similar to Fig. 1 showing the parts in cranking position; and

Fig. 3 is a similar view showing the parts in the positions assumed when the engine starts and causes the driving pinion to overrun the starting motor.

In Fig. 1 of the drawing there is illustrated a power shaft 1 which may be the extended armature shaft of a starting motor not illustrated, or may be coupled to the armature shaft 2 by any suitable means as illustrated. The power shaft is provided on one end with an enlargement 3 forming a driving head having overrunning clutch teeth 4 formed thereon. A hollow screw shaft 5 is slidably journaled on the power shaft and is provided with clutch teeth 6 which mate with the teeth 4 on the driving head 3 for transmission positively of cranking torque from the power shaft to the screw shaft.

An abutment ring 7 is mounted on the power shaft and bears against a split thrust ring 8 which is seated in a groove 9 in the power shaft and occupies a counterbore 10 in the abutment ring 7 whereby the lock ring is confined in its seat. A thrust washer 11 is loosely mounted on the power shaft between the screw shaft 5 and the abutment ring 7, and a light compression spring in the form of a dished split washer 12 located between the thrust washer 11 and the abutment ring 7 serves to urge the clutch teeth 6 into engagement with the teeth 4 on the driving head 3. The abutment ring 7 is provided with a second counterbore 13 which houses the spring 12 when the thrust washer 11 is pressed against the abutment.

A pinion 14 is slidably journaled on the power shaft 1 for movement into and out of engagement with a gear 15 on the engine to be started. Means for actuating the pinion from the screw shaft 5 is provided comprising a control nut 16 which is threaded on the screw shaft, and a barrel member 17 surrounding the control nut and having at one end a splined connection 18 to said pinion. In order to transmit rotation from the control nut to the barrel, the control nut is formed at one end with a radial flange 19, and a plurality of friction discs 21, 22 are splined alternately to the barrel and control nut and are compressed between the flange 19 of the control nut and a thrust ring 23 which is urged toward the flange 19 by a plurality of compression springs 24 bearing against an adjustment abutment 25 threaded on the control nut.

Hub 26 of the pinion which is splined within the end of the barrel 17 is retained in the barrel by means of a thrust ring 27 and a lock ring 28 seated in the end of the pinion hub. Means for normally holding the pinion 14 in extended relation to the barrel is provided in the form of a mesh-enforcing spring 29 located in the barrel between the thrust ring 27 and a spacing thimble 31 which bears against the end of the control nut. The reaction of the mesh-enforcing spring 29 is taken by a lock ring 32 seated in the free end of the barrel 17 and forming a retaining abutment for the thrust ring 23 of the friction coupling 21, 22.

Means for holding the pinion 14 in engagement with the engine gear 15 until the engine has been successfully started, is provided in the form of a detent member 33 slidably mounted in a radial bore in the flange 19 of the control nut, and yieldably pressed against the periphery of the screw shaft by a spring 34. The screw shaft has a notch 35 in position to receive the detent 33 when the pinion 14 is meshed with the engine gear 15. The notch terminates in a shoulder 36 which engages the detent 33 upon initiation of the demeshing movement of the control nut and resists such movement until the detent is withdrawn by centrifugal force caused by the rapid rotation of the pinion and barrel assembly when the engine starts. In order to yieldably hold the parts in idle position, the screw shaft 5 is formed with an inclined shoulder or ramp 37 which cooperates with the detent 33 to prevent the pinion from drifting toward the engine gear 15 due to vibration while the engine is in operation.

In operation, starting with the parts in the positions shown in Fig. 1, rotation of the power shaft 1 in the direction of the arrow is transmitted to the screw shaft 5 through the clutch teeth 4, 6, whereby the control nut 16 is threaded along the screw shaft, moving the pinion 14 into mesh with the engine gear 15, the fully meshed position being defined by the abutment ring 7 which arrests the movement of the control nut as shown in Fig. 2. At this time the screw shaft 5 is forced against the driving head 3 by the screw-jack action of the control nut, thus firmly compressing the overrunning clutch teeth 6, 4 for positive transmission of torque.

If, during the meshing movement, tooth abutment should occur between the pinion and the gear, the longitudinal movement of the pinion is momentarily arrested, but the meshing movement of the barrel 17 continues as permitted by the splined connection 18, under the control of the mesh-enforcing spring 29. Torque is thus yieldably applied to the pinion 14 to index it into proper registry with the tooth spaces of the engine gear, after which the mesh enforcing spring expands, snapping the pinion into initial engagement, and meshing proceeds as usual.

It will be appreciated that in view of the fact that it is the pinion only which is thus arrested in its movement to enforce mesh, there will be only a very slight impact involved, and meshing will in all cases proceed quietly and without injury to the gear teeth.

When the control nut 16 is arrested by the abutment ring 7, the consequent transmission of torque from the motor to the engine gear is cushioned by the overload slip coupling 21, 22 which thus absorbs the peak torque and protects the parts against overload.

When the engine starts, the pinion and barrel assembly are accelerated by the engine gear, causing the control nut to thread itself back on the screw shaft until the detent 33 engages the shoulder 36. This movement is sufficient to permit the screw shaft 5 to move to the right against the action of the clutch spring 12, allowing the clutch teeth 6, 4, to discharge and permit the screw shaft to overrun the power shaft as shown in Fig. 3.

When the rotation of the overrunning parts is sufficiently rapid to withdraw the detent 33 by centrifugal force the parts are permitted to return to their idle position.

Although but one form of the invention has been shown and described in detail, it will be understood that other embodiments are possible and that changes may be made in the precise form and arrangement of the parts without departing from the spirit of the invention.

I claim:

1. In an engine starter drive a power shaft, a screw shaft slidably journalled thereon and having a dental overrunning clutch connection therewith, an abutment on the power shaft limiting declutching movement of the screw shaft thereon, a light compression spring between the screw shaft and said abutment tending to close the clutch; a pinion slidably journaled on the power shaft for movement into and out of mesh with a gear of the engine to be started, a control nut threaded on the screw shaft, a barrel member surrounding the control nut and having a splined connection at one end with the pinion, means limiting the relative longitudinal movement of the barrel and pinion, means including a compression spring normally keeping the pinion in extended relation to the barrel, and means including an overload slip coupling for transmitting rotary and longitudinal movement from the control nut to the barrel.

2. An engine starter drive as set forth in claim 1 including further a centrifugally movable detent in the control nut bearing on the screw shaft and said screw shaft having a peripheral abutment so positioned as to engage the detent and oppose demeshing movement of the control nut until the detent is withdrawn by centrifugal force.

3. A starter drive as set forth in claim 1 in which said abutment is in the form of a ring seated on the power shaft, and including further a thrust washer between the end of the screw shaft and the overrunning clutch spring and forming a thrust bearing between the control nut and abutment ring, said abutment ring having a counter-bore on both sides, one counter-bore serving to house the overrunning clutch spring; said power shaft having a peripheral groove for defining the position of the abutment ring thereon, and a split thrust ring in the groove seated in the corresponding counterbore of the abutment ring.

4. A starter drive as set forth in claim 1 in which the overload slip coupling comprises an assembly of a plurality of rings splined alternately to the barrel and control nut, and adjustable spring means on the control nut for compressing said assembly.

References Cited in the file of this patent

UNITED STATES PATENTS 2,620,671    Digby  ---------------- Dec. 9, 1952